350-3.6 SR
XR 3,541,252
X 3055T
ARCH ROOM
X 3076A
(6)

HOLOGRAPHIC METHOD FOR VIEWING CHANGES IN A SCENE

Filed Dec. 21, 1966 2 Sheets-Sheet 1

SUBSTITUTE FOR MISSING XR

INVENTOR R. J. COLLIER
K. S. PENNINGTON
BY Wilford L. Wisner
ATTORNEY

United States Patent Office 3,541,252
Patented Nov. 17, 1970

3,541,252

HOLOGRAPHIC METHOD FOR VIEWING CHANGES IN A SCENE

Robert J. Collier, New Providence, and Keith S. Pennington, Basking Ridge, N.J., assignors to Bell Telephone Laboratories, Incorporated, Murray Hill and Berkeley Heights, N.J., a corporation of New York Filed Dec. 21, 1966, Ser. No. 603,496
Int. Cl. H04n *1/38, 7/12*
U.S. Cl. 178—7.2 4 Claims

ABSTRACT OF THE DISCLOSURE

A real-time transmission-bandwidth-reduction technique for television systems is disclosed in which a hologram is formed in response to an original phase-object display, and subtraction of the unchanged portion of a subsequent phase-object display is achieved by projecting a phase-object form of the subsequent display through the hologram to produce a phase-modulated, conjugate diffracted beam representative of the differences between the displays. This phase-modulated beam is then converted to an intensity-modulated beam and detected and scanned for transmission by a device such as a standard television vidicon. Each phase-object display is created from a conventional image by electron beam modification of a deformable oil film. The phase-modulated beam from the hologram is converted to an intensity-modulated beam by interference with a secondary phase-related reference beam having an effective $\pi/2$ radians phase shift relative to the average phase of the phase-modulated beam.

Figure 1:
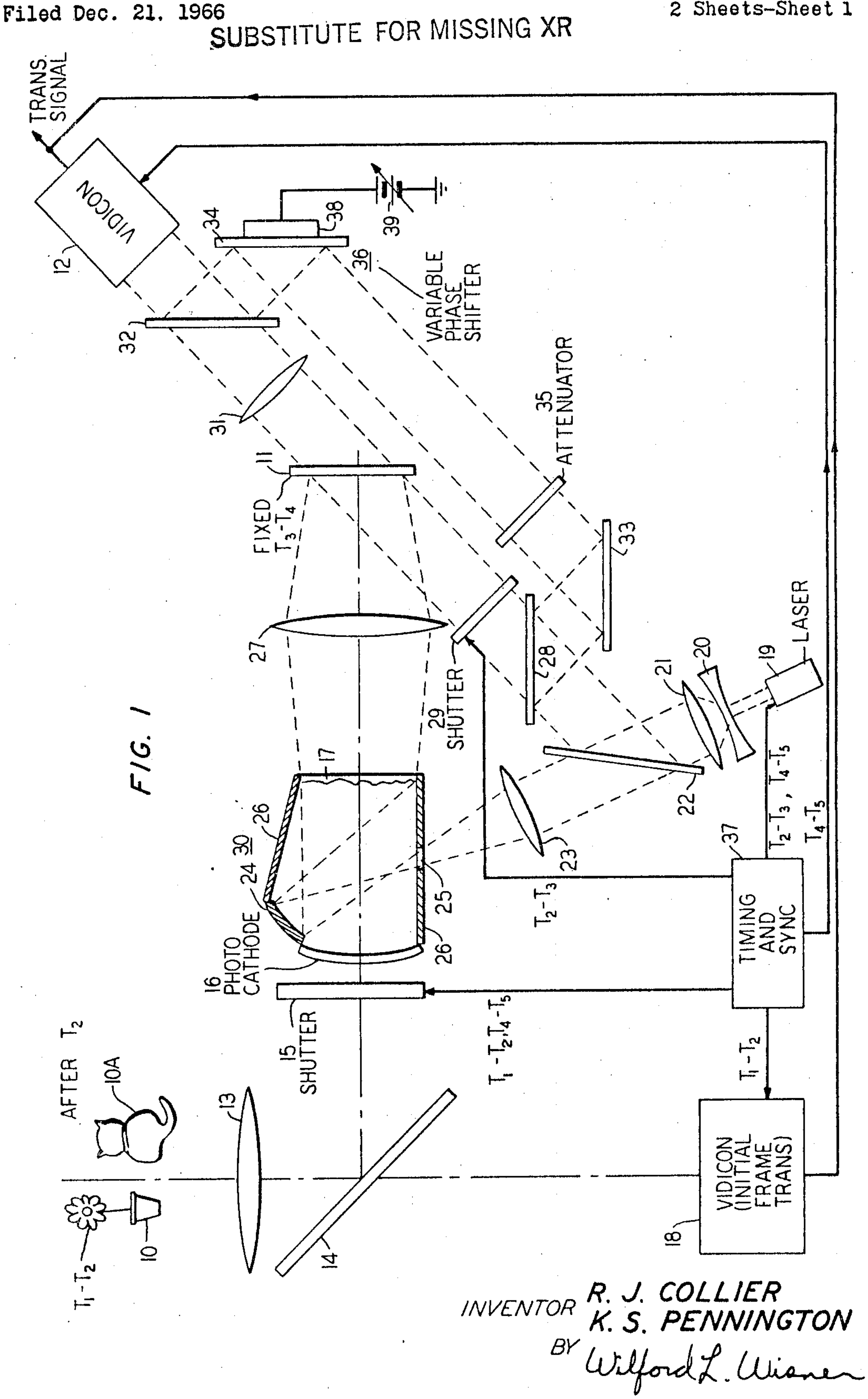

In the concurrently-filed related application of Herwig W. Kogelnik, Ser. No. 603,551, which is assigned to the assignee hereof, a method is disclosed for obtaining clear images of objects through a relatively thin distorting medium. A particular use of that method for facilitating eye contact between communicating televised persons is disclosed in the concurrently-filed related application of Donald R. Herriott, Ser. No. 603,550, also assigned to the assignee hereof.

Our invention is related to the foregoing in that it employs a form of hologram in which various regions have a one-to-one correspondence to various regions of an object, and in that it employs conjugate-order diffracted light during wavefront reconstruction. With respect to its typical use environment, our invention is particularly applicable to television transmission systems in which bandwidth reduction is desired.

Bandwidth in an information transmission system is the width of the frequency band employed to transmit the information. The bandwidth is directly related to the amount of information to be transmitted within a prescribed period of time. Bandwidth reduction becomes possible when there is redundancy in the information and, broadly, is achieved by eliminating at least portions of the redundant information. The desirability of bandwidth reduction is greatest in a television transmission system because of the great amount of information, including redundant information, contained in an image of a changing scene.

Our invention enables one effectively to delete optically the unchanged portions of a scene, rather than removing the redundant information after electronic scanning of the image formed in the television camera.

Our invention resides in the recognition that the differences between changed portions of a scene and the original can be transmitted selectively by making an image-hologram of a phase-object form of the initial scene to be televised, projecting a phase-object form of the changed scene through the image former and the hologram, and converting the phase-modulation of the conjugate diffracted light wavefront to intensity modulation of a light wavefront. The latter wavefront then can be formed into an image that shows only the differences in intensity between the changed portions of the scene and the original scene and can be scanned conventionally for transmission.

The phase-object is a representation, in a sufficiently thin, substantially transparent medium, of the scene to be televised. In this medium, various regions provide differing phase retardations of transmitted light wave. The phase retardations correspond one-to-one to the intensities of various parts of an ordinary image of the scene. Illustratively, the image is formed on a photocathode; and the electrons emitted therefrom strike a thin oil film, sometimes called an Eidophor oil film, in which the phase-object is thereby formed.

The image-hologram is formed in the manner disclosed in the above-cited, concurrently-filed application of H. W. Kogelnik, with the qualification that the relatively thin distorting medium involved in that technique becomes the phase-object employed in our technique. Specifically, an image-hologram is formed when initially coherent light is scattered from the phase-object (e.g., thin distorting medium) and is focused to an image upon a holographic medium in the presence of a coherent reference beam. In other words, the holographic medium is disposed at the image plane of an image-forming lens with respect to the phase-object. A one-to-one correspondence between various regions of the phase-object and various regions of the hologram results. Wavefront reconstruction is then performed by imaging light scattered from a changed phase-object on the hologram.

In this application, the term hologram will be used in the sense of an exposed holographic medium, whether or not a permanent record is formed.

Conversion of the phase-modulation of a reconstructed wavefront to intensity modulation of a wavefront is illustratively accomplished by interference of the conjugate-order diffracted light with a portion of the reference beam suitably shifted in relative phase, but could also be accomplished by other techniques, such as prior art phase-contrast techniques.

Figure 2:
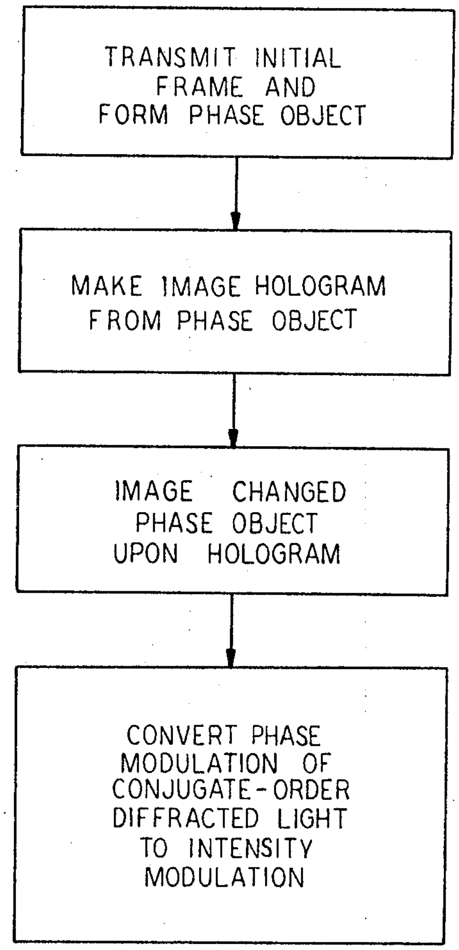

Various features and advantages of the present invention will become apparent from the following detailed description, taken together with the drawing, in which:

FIG. 1 shows, in pictorial and block diagrammatic form, an arrangement for practicing a preferred method according to our invention; and FIG. 2 shows, in flow diagram form, the basic steps of the preferred method.

In FIG. 1, there is shown an arrangement for practicing the method of the present invention. The purpose of the method is to obtain a record of an initial scene in a form that enables difference information about subsequent changes in the scene to be transmitted selectively to a remote receiving station. Simultaneously with the making of the record, the initial scene is to be transmitted to the receiving station, where the signal will be stored in a suitable storage register. When subsequent signals corresponding to changes in the scene are transmitted, they will replace the portions of the previously stored signal corresponding to parts of the initial scene that have changed. Since the receiving station apparatus is conventional, it will not be discussed in detail in connection with the present invention.

In the initial step of the method, a phase-object representation of the initial scene is formed while, simultaneously, light from the initial scene, e.g., a flowerpot 10, passes through a field lens 13 and a partially transmissive reflector 14 and is brought to an image in vidicon 18 in order to be transmitted to the remote receiving station. The nature and technique of the phase-object representation can be explained as follows.

Specifically, the initial scene is projected through a lens 13 and partially reflected by a reflector 14 through a shutter 15 to fall upon a photocathode 16. A two-dimensional pattern of electrons corresponding to the initial image of the scene is emitted from the photocathode 16 and travels to the secondary object plane at which is disposed a deformable target, illustratively an Eidophor oil film 17, which after bombardment by the electrons becomes a so-called phase-object form of the initial scene.

Hereinafter the term phase-object will be used to denote a relatively thin, light-transmissive deformable medium in which the intensity variations typically found in an optically-formed image are converted into relative phase-retardation variations for light passing through various regions of the medium. In other words, if the direction of propagation of light is called the Z-axis and if the deformable medium is oriented orthogonally thereto, then intensity modulation of light in an image of the scene is converted to phase-modulation capabilities in the X–Y plane within the medium 17. The medium 17 has the capability of imposing upon coherent light subsequently passed therethrough a phase-modulation in the X–Y plane.

During the initial step which provides the initial phase-object representation of the scene, the portion of the light not reflected toward shutter 15 is passed through the partially transmissive reflector 14 and is received, scanned, and transmitted by usual television techniques, that is, by the vidicon 18 and associated apparatus. This initial period is symbolized by the legend $T_1$–$T_2$. At the end of the period, the shutter 15 is closed and the vidicon 18 is turned off. Subsequent changes in the scene are to be transmitted by the vidicon 12.

There ensues a period, $T_2$–$T_3$, for the exposure of a holographic medium 11, such as a high-resolution photographic film that is as thin as possible. An interference pattern is to be made by employing the phase-object representation of the initial scene. Coherent light from a laser 19 is formed into a broad beam by diverging lens 20 and recollimating lens 21 and then split by the partially transmissive reflector 22. One portion of the broad beam, hereinafter designated the object wavefront, passes through a wavefront-forming lens 23 and is directed through the phase-object 17 by an appropriately disposed reflector 24. Illustratively, the object wavefront passes through an appropriate aperture 25 in the opaque nonreflecting side walls 26 of the image intensifier 30. The object wavefront, suitably phase-modulated in the X–Y plane by the phase-object 17, is focused by the lens 27 to image the phase-object 17 upon the previously unexposed holographic medium 11. Simultaneously, the portion of the broad beam reflected by reflector 22 is directed, in part, through a partially transmissive reflector 28 and through a shutter 29 in which is open during the period $T_2$–$T_3$ to fall upon the holographic medium 11 at an acute angle with respect to the direction of propagation of the object wavefront. This beam will be hereinafter designated the reference beam. At the end of the period $T_2$–$T_3$, the laser 19 is turned off and the medium 11 is developed to fix the interference pattern formed therein by the object wavefront and the reference beam.

Th developing, or fixing, step continues for a period $T_3$–$T_4$ during which shutters 15 and 29 are both closed and the holographic medium 11 is otherwise shielded from disturbing background light.

During the ensuing period $T_4$–$T_5$, a changed phase-object is formed in the medium 17; and coherent light is passed therethrough imaging the changed phase-object upon the developed hologram 11. During this period the laser 19 is turned on again and the shutter 15 is open. The shutter 29 remains closed. During this period, the vidicon 12 is turned on and receives, as a reconstructed light wavefront, the conjugate-order portion of light diffracted by the interference fringe pattern in hologram 11. This light is focused by the lens 31 to image the differences between the changed and original phase-object onto the face of vidicon 12.

Phase-modulation of the wavefront is converted to intensity modulation as follows. The fraction of the beam from the laser 19 reflected from the partially transmissive reflector 28, the reflector 33, and the reflector 34 and the partially transmissive reflector 32 is also directed collinearly with the conjugate-order diffracted light into the input optics into the vidicon 12. This beam is therefore phase related to the diffracted light and may be called a secondary reference beam. The secondary reference beam is suitably attenuated by an attenuator 35 and shifted one-half pi radians in phase relative to the phase of the unmodulated portion of the diffracted light. For example, the phase shift can be effected and adjusted by means of the variable phase shifter 36. The sum of the secondary reference and the imaged differences between changed and original phase-objects are square-law detected by the vidicon which responds to the square of this amplitude sum, i.e., the intensity. These spatial variations of intensity are scanned and suitably coded to generate a signal for transmission. The generation and transmission of the signal is the final step of the process and is conventional, except for the reduced bandwidth of the transmitted signal.

The coordination of the various steps of the above-described operation is achieved by timing and synchronization circuit 37 which can be conventional circuitry arranged to supply switching pulses at the appropriate times.

Image intensifier 30, which includes an assembly of photocathode 16 and Eidophor oil film 17, might be called an image intensifier with deformable target. The mirror 24 disposed therein to direct the object wavefront upon the oil film 17 is specifically adapted for the purpose of the present invention and should focus the object wavefront so that it covers as large a part of the film 17 as possible. Likewise, the aperture 25 is cut specifically to admit the object wavefront, as focused by the lens 23.

The lenses, mirrors, shutters and vidicons are standard-type optical components readily available commercially. It should be noted that the lens 27 is disposed between the oil film 17 and the holographic medium 11 so that the latter is at the image plane of the lens with respect to the former. In this way an image-hologram will be formed, as disclosed in the above-cited, concurrently-filed application of H. W. Kogelnik. That is, there will be a one-to-one correspondence between various regions of the oil film 17 and optically corresponding regions of the holographic medium 11.

The variable phase shifter 36 illustratively includes a piezoelectric crystal 38 disposed to adjust the optical path length for the secondary reference beam by adjusting the position of mirror 34. The crystal 38 is driven by an adjustable voltage source 39. Alternatively, an electrooptic cell having a single optic axis under the influence of an electric field can be disposed to pass the secondary reference beam along a preferred direction therein. Cells employing nitrobenzene or potassium tantalate niobate (KTN) are illustrative.

The laser 19 is illustratively a helium-neon laser of known type operating at 6,328 angstrom units. Illustratively, it can be switched on and off by turning the pumping power supply on and off or by means of a shutter placed in front of it.

The operating method of the invention may be described broadly as shown in the sequence diagram of FIG. 2. The first step of transmitting the initial frame and forming the corresponding phase-object occurs during the time period $T_1$–$T_2$ and has been previously described hereinbefore. An additional operating detail with respect to this step is that the information transmitted from vidicon 18 is not only displayed on a television screen of a suitable receiver at the remote station but is also stored in a suitable signal storage register of the receiver. Each storage location in the register corresponds to a particular point or discrete area on the television picture to be displayed. As information is received concerning differences between the changed and initial scene, this information is effectively added with the proper sign to the information previously stored at the appropriate location in the storage register.

With respect to the formation of the phase-object, it should be noted that the energy of the electrons emitted from photocathode 16 and traveling in a direction essentially normal to the surface of the oil film 17 are essentially directly related to the intensity of light incident upon the photocathode 15 from the left. The thickness of the oil film 17 after bombardment by the electrons is inversely related to the energies of the electrons which strike it in each relatively small area thereof. The effective resolution depends upon the physical characteristics of the particular oil film, which should be of the type desired in prior art systems related to the Eidophor system, as disclosed in the Journal of the Society of Motion Picture and Television Engineers, vol. 60, pp. 344, 351 (1953), by E. Baumann.

The second step of the method, which occurs during the time period $T_2$–$T_3$, is to make an image-hologram from the phase-object now embodied in the oil film 17. Lens 27 images the deformed oil film 17 upon the holographic medium 11 so that the interference fringe pattern formed by the object wavefront passing therethrough and the reference beam, which illustratively is a plane wave at the plane of medium 11, consists of a plurality of relatively small different patterns corresponding to different regions of the oil film 17. Unlike holograms made with unfocused light, an image of the entire phase-object cannot be reconstructed by merely illuminating a portion of the developed hologram. To the contrary, it is now necessary to illuminate the entire developed hologram in order to achieve the desired reconstruction with plane wave reconstruction where there are unchanged portions of the scene.

The developing, or fixing, step, during the period $T_3$–$T_4$, while not necessarily an essential step of the invention, can be considered to be part of the hologram-making step. Illustratively, one of the new rapid development techniques now known in the optical art could be employed in the step. Alternatively, no development need be used if a new initial frame is transmitted and a new hologram formed as the prior hologram begins to bleach to an unacceptable extent. In other words, the medium 11 could be a portion of a continuous strip of motion picture film which would be advanced as in a motion picture camera. Preferably, the life of the hologram 11 is at least as long as the total period during which changes in the original scene become so substantial that there remains at the end of that period no significant savings in transmission bandwidth as compared to transmitting the entire scene once more.

The step of making and projecting a changed phase-object will now be described. Illustratively, this occurs during the period $T_4$–$T_5$. Assume that sometime after $T_2$ a cat 10A moves into the object field of the lens 13 and sits alongside the flowerpot 10 which was present in the original scene. Although this is a case of a simple addition to a scene which may not involve obliteration of significant information in the prior scene, the principles are the same whether or not significant information is obliterated. In other words, there was some prior image information for the position in which the cat now sits. The changed scene is focused upon the photocathode 16 through the shutter 15 which is now open, and the oil film 17 is changed correspondingly by the spatially modulated electron beam that is now incident over its entire surface. The light from laser 19, which now illuminates the changing phase-object, will be phase-modulated spatially by the oil film and will be imaged upon the hologram 11 by the lens 27 as a reconstructing illumination.

The conjugate-order portion of the diffracted light will be the product of the modulated light wavefront and the transmission characteristic of the interference fringe pattern in medium 11 and will be essentially a uniform wavefront substantially like that of the original reference beam in those areas of the hologram illuminated by unchanged portions of the phase-object. Nevertheless, the conjugate-order portion of diffracted light will be modulated in those areas corresponding to areas of the hologram illuminated by changed portions of the phase-object.

It can be shown mathematically that the modulation in the modulated portions of the wavefront is a modulation of the phase of the wavefront by the difference between the corresponding phases of the original and changed phase-objects.

In other words, the difference between the phase-objects is presented as phase-modulation on the carrier wavefront provided by the laser. This difference information is as yet unintelligible to the eye for two reasons. First of all, it needs to be converted from phase-modulation to intensity modulation; and, second, it needs to be added to the old image intensity information to provide the intensity of each point of the new image, since the transmitted information concerning a change in the scene is the difference in intensities of the old and new images at that point. It may be seen that the intensity-difference form in which the image-change information is transmitted enables very simple updating of the display on the receiver screen. Herein lies an advantage of the present invention in addition to those described hereinbefore in the summary of the invention.

The conversion from phase-modulation to intensity modulation is achieved by interference between the conjugate-order diffracted light imaged by a lens onto the vidicon face and the secondary reference beam shifted in phase by one-half pi radians. The interference, in fact, occurs at a suitable cathode surface within the vidicon 12 and can be mathematically demonstrated to result in a conversion of the phase-modulation to an intensity modulation which is the difference in intensities of the two images in the regions of change. Although still not intelligible this information is then scanned by vidicon 12, suitably coded and transmitted as in prior television systems. It occupies a reduced frequency band and is added to the information in the appropriate locations of the storage register at the receiver to provide the new image intensity information. The next frame displayed upon the television receiver is then derived from the information in the storage register.

At some point in time, illustratively $T_5$, but possibly also many changed phase-objects later, the changes in the original scene have become so substantial that the entire scene must be retransmitted. Then the above-described process is repeated in its entirety.

Various modifications of the above-described embodiment and method are possible. For example, the conversion from phase-modulation to intensity modulation can be achieved by the Zernicke phase-contrast method or Schrierien techniques, all of which are well known in the art. Further, the Eidophor oil film 17 could be replaced by a thermoplastic material which has a sufficiently rapid response to changes in electron or heating patterns incident upon it. The holographic medium 11 could likewise be replaced by some material, such as a photochromic material, in which a semipermanent record of an interference fringe pattern can be made.

A more fundamental modification of the foregoing apparatus and method, but still within the scope of the present invention, would involve the scanning of the phase-object medium 17 with an electron beam in response to the output signal from vidicon 18. By this technique, the reflector 14, shutter 15, and photocathode 16 could be eliminated; and the phase-object 17 could be illuminated at a better angle by the coherent radiation from laser 19. This modification provides somewhat slower transmission of information concerning changes in the scene being televised.

Various other modifications of the above-described embodiments can be made by those skilled in the art according to the principles of the present invention without departing from the spirit and scope of the invention.

What is claimed is:

1. A method of selectively transmitting differences between an initial and a changed scene, comprising the steps of forming a first phase-object representation of an initial scene while transmitting the initial scene, forming an image-hologram responsive to the phase-object representation of said scene, forming a second phase-object representation of a scene having changed portions with respect to said initial scene, passing coherent light through said second phase-object representation and imaging said passed light upon said hologram to form a phase-modulated reconstructed beam including conjugate-order diffracted light, converting phase-modulation of said reconstructed beam to intensity modulation, and transmitting a signal related to said intensity modulation.

2. A method according to claim 1 in which the steps of forming the first and second phase-object representations both include the step of employing electrons to deform a light-transmissive target.

3. A method according to claim 1 in which the converting step includes the step of directing a suitably phase-shifted secondary reference beam to interfere substantially collinearly with the phase-modulated reference beam.

4. A method according to claim 3 in which the converting step includes the step of shifting the phase of the secondary reference beam to have a phase of $\pi/2$ radians with respect to unmodulated portions of the interfering reconstructed beam.

References Cited

UNITED STATES PATENTS

| | | |
|---|---|---|
| 2,202,605 | 5/1940 | Schroter. |
| 2,321,611 | 6/1943 | Moynihan. |
| 2,951,899 | 9/1960 | Day. |

OTHER REFERENCES

Reith, Upatniers, Hildebrand, Haines: Requirements for a Wavefront Reconstruction TV Facsimile System, October 1965, Jour. of Smpte, vol. 74, No. 10, pp. 893–896.

Gabor, Stroke, Brumm, Funkhouser, Labeyrie: Reconstruction of Phase Objects by Holography, December 1965, Nature, vol. 208, pp. 1159–1162.

Tanner: Some Applications of Holography in Fluid Mechanics, J. Sci. Instrum., February 1966, vol. 43, No. 2, pp. 81–83.

Holographic Vibration Analysis Promising for Non-Destructive Ultrasonic Testing, Laser Focus, September 1966, pp. 31–32.

ROBERT L. GRIFFIN, Primary Examiner

J. A. ORSINO, Jr., Assistant Examiner

U.S. Cl. X.R.

178—6; 350—3.5